United States Patent Office 3,176,173
Patented Mar. 30, 1965

3,176,173
ELECTRIC MOTOR BRAKE
Hermann Straub and Siegfried Krauss, Friedrichshafen, Germany, assignors to Zahradfabrik Friedrichshafen, Aktiengesellschaft, Friedrichshafen am Bodensee, Germany
Filed Sept. 10, 1962, Ser. No. 222,298
6 Claims. (Cl. 310—59)

This invention relates to electric motors, and more particularly to solenoid operated brakes therefor.

The braking of electric motors by means of solenoid operated brakes has heretofore been known. The present invention relates to certain improvements in connection therewith, whereby solenoid operated brakes may be utilized for stopping motors which rotate heavy loads by rapidly effective a smooth braking action with a minimum of heat generated in the brake. Therefore, it is among the objects of the invention to provide a rugged and compact brake mechanism which can be readily made a component motor; to provide a novel braking means which will have long lasting qualities and which can be readily controlled by solenoid action; to ensure passage of cooling fluid such as air, through the braking elements, and other purposes as will be apparent from the description which follows.

Briefly, the invention contemplates utilization of an electric motor shaft and housing, for support of a solenoid operated magnet and certain brake elements, and for housing thereof. Further, a fan is carried at the same end of the shaft which carries a solenoid magnet and the braking elements, and pasasges are so arranged that the fan induces air through the braking elements from outside the housing and thence into the motor housing, whereby the brake and the motor are cooled by action of the same fan.

The arrangement is such, in one form of the invention, that the fan is driven by a one-way clutch or free wheeling device whereby its rotation continues, due to its momentum, after the shaft stops rotating, so as to continue the cooling effect on the brake elements thereby avoiding heat peaks. The modifications disclosed herein utilize solenoid magnets which may be energized or de-energized automatically or manually. Thus, in one modification, the brake elements are normally disengaged when the motor is energized, the solenoid magnet being then energized to maintain brake disengagement. However, when the motor is de-energized, the solenoid magnet is likewise de-energized being merely connected in shunt across the motor whence springs are utilized to effect engagement of the brake elements. In another form of the invention, the solenoid magnet may be switched on or off to effect brake engagement or disengagement at the will of an operator.

In all forms of the invention, the brake elements comprise rollers which are situated between contiguous frictional surfaces and when pressure is placed on the rollers by movement of one of said surfaces a frictional drag occurs by a combination of rolling and sliding movement of the rollers. It has been found that the use of rollers in this manner serves the purpose of effecting stoppage of heavy loads without causing undue wear of the rollers and such stoppage is effected very quickly and smoothly.

Various forms and orientations of rollers may be utilized, as will be apparent from the detailed description which now follows in conjunction with the appended drawing in which.

Figure 1:
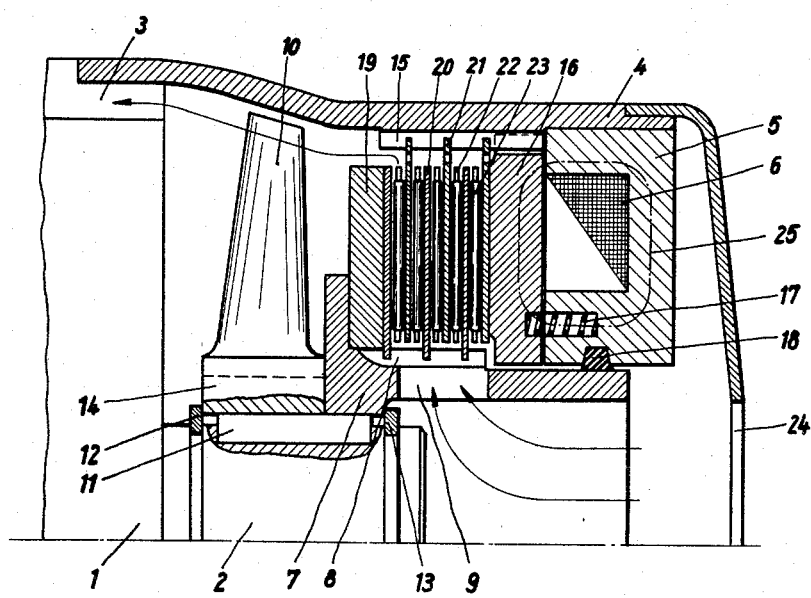
FIG. 1 is a fragmentary cross sectional elevation of the end of a motor having a housing showing a motor shaft and a brake therein.
Figure 2:
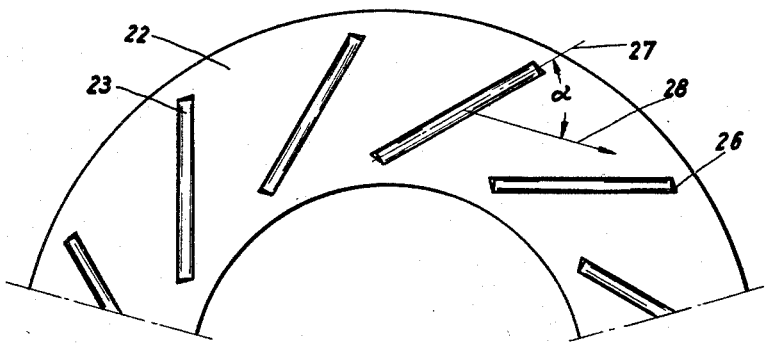
FIG. 2 is a plan of a portion of one of the brake elements showing a cage carrying rollers in slots thereof.

Reference is now made to FIG. 1 of the drawing showing an electric motor 1 from which extends the motor shaft 2. The housing has cooling ribs 3 interiorly arranged and the housing has an extension 4 which forms a brake housing. The shaft is encompassed by a solenoid operated magnet 5 having a solenoid 6. The magnet is capable of attracting an armature 16 by virtue of the flux path 25, the armature being normally maintained away from the magnet by a series of angularly related springs 17, one such spring being shown. Magnet 5 encompasses a tubular extension 7 carried on the shaft 2, and the spacing between the inner bore of the magnet and extension 7 is sealed by a packing ring 18 to prevent air leakage therebetween. Extension 7 is keyed by key 11 to shaft 2 and has a plate 19 which backs the frictional package. The magnet is carried by the brake housing 4 to which it is secured, and such brake housing is splined at 15 for slidable engagement with a series of frictional outer brake rings, such as 21. The tubular extension 7 has a similar series of splines 8 for slidable engagement with a series of inner brake elements 20. Intermediate the inner and outer brake elements are cages, in effect, rings 22 having a series of slots 26, each slot carrying a cylindrical roller 28, the axes 27 of the rollers being set at an angle of less than 90° with respect to the tangential direction around the ring axis, as indicated by the arrow 28. Thus, the frictional package so assembled can effect a heavy braking action when placed under pressure, and such braking action is exceedingly rapid, though smooth. Further, only a very small movement of the frictional package is required to effect such braking action.

Thus, the springs 17, when solenoid 6 is de-energized, would normally maintain pressure for effecting brake engagement. However, when the solenoid is energized, attraction of the armature releases such pressure and only a very slight movement of the armature reduces the braking effect to substantially zero, in an exceedingly small period of time.

Carried on the shaft 20 is a fan 10, there being a one-way clutch or free-wheel drive arrangement 14 of any suitable conventional construction intermediate the shaft and the fan. Thus, the fan rotates with the shaft, being driven thereby, but when the shaft stops its rotation under braking force, the fan will continue to rotate due to its mass and speed. By virtue of the large end opening 24 in the end casing member and the radial opening through the wall of the tubular extension 7, which is radially aligned with the frictional package, and due to the circumferential spacing around the outer regions of such frictional package, the fan will induce air currents in the direction of the arrows, as shown, which air currents will be propelled through the ribs 3 of the motor housing. Accordingly, any heating up effect in the brake elements will be cooled down due to the continued rotation of the fan and thus heat peaks are avoided in the mechanism.

It will be apparent that if the solenoid 6 is in shunt across the motor, it will be energized and de-energized along with the motor. Therefore, when the motor is operating, the armature 16 is attracted to the magnet against the bias of springs 17 and the brake elements do not have any effect. When the motor is shut off, the solenoid 6 is de-energized permitting the springs to apply the brake.

Figure 3:
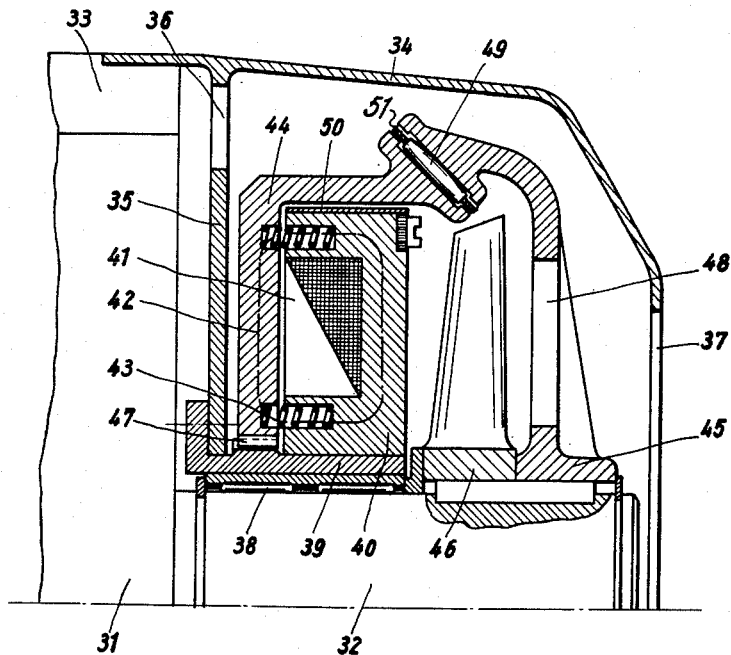
FIG. 3 is a view similar to FIG. 1 but of a modified form of the construction.

Referring now to FIG. 3, a construction is shown comprising a motor 31 having cooling ribs 33 and an end housing 34 which encompasses the end of the motor shaft and brake elements. Thus, the end housing 34 is integral with a radial wall 35 having vent apertures 36 therethrough. The inner bore of wall 35 is secured to a flanged bushing 39 which is in turn carried on needle bearings 38 on the motor shaft 32. Carried on bushing 39 is the magnet body 40 having solenoid 41. An armature 42 is slidably splined at 47 on bushing 39 and is spring biased by springs, as shown, away from the solenoid magnet. The armature 42 has a cylindrical portion terminating in a conical flange, as shown. A complementary conical flange is provided as part of a brake element 45. This latter flange is keyed to the shaft 32 and it is provided with one or more vent apertures such as 37. Intermediate the complementary conical surfaces of the elements 44 and 45, are a series of tapered rollers 49, inserted in a cage ring 51. Thus, the rollers may be described as barrel shaped, being smooth, and thicker at the center than at their ends, and are retained in respective recesses in either of the conical surfaces. The bushing 50 is made of non-magnetic material.

Keyed to the shaft is a fan 46 which rotates with the shaft to induce air to flow through the openings 37 and 48, the spaces and gaps between the conical surfaces of the elements 44 and 46 and thence outwardly thereof, through the openings 36 into the cooling ribs 33 of the motor. In this form of the invention, it will be apparent that energization of the solenoid will effect application of the brake by virtue of movement of the armature to put pressure on the rollers 49. Accordingly, the solenoid 41 is operated independently of motor current, or it may be connected by suitable circuitry to be in response thereto. Alternatively, manual selective control of energization of the solenoid can be utilized and the brake arrangement thus shown in FIG. 3 could be used to advantage as a holding brake.

Figures 4, 5:
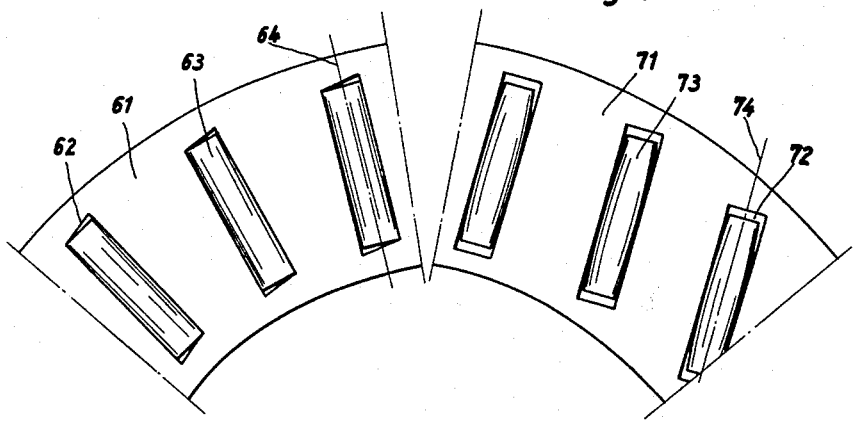
FIGS. 4 and 5 are views similar to FIG. 2 but showing modified forms of the roller and cage constructions.

Various arrangements of rollers and forms of cage rings may be utilized. Thus, in FIG. 4, a cage 61 is provided with slots 62 for carrying cylindrical rollers 63 having axes 64 arranged radially with respect to the longitudinal axis of the clutch. The arrangement in FIG. 5 shows the cage ring 71 having recesses 72 carrying end tapered rollers 73, having axes 74 which are parallel to each other, or substantially so.

Having thus described our invention, we are aware that various changes may be made without departing from the spirit thereof, and accordingly, we do not seek to be limited to the precise illustration herein given except as set forth in the following claims.

We claim:

1. The combination of an electric motor having a shaft with a hollow, open end and a brake therefor comprising spaced frictional elements surrounding said shaft at said end, means for effecting engagement and disengagement of said frictional elements, a fan mounted on said shaft axially inwardly of said frictional elements, a one-way drive clutch intermediate said fan and said shaft, ventilating passage means through said hollow end disposed to conduct air to said frictional elements as effected by rotation of said fan, said air entering the hollow end of said shaft at said open end and passing radially to said frictional elements and therebetween and being drawn radially outwardly by said fan to take an axial direction through said fan, wherein said fan continues to rotate by momentum after said frictional elements have effected stopping of said shaft.

2. The combination of an electric motor housing, an electric motor shaft extending through said housing and a brake comprising a solenoid operated magnet surrounding said shaft, frictional elements surrounding said shaft and control means comprising an armature actuable by said magnet and disposed to effect control of said frictional elements, one of said elements being non-rotative, and the other of said elements being rotative with said shaft, and roller means in angularly spaced array intermediate said elements and in contiguity therewith, said roller means being effective to transmit drag between said elements when said elements are pressed toward each other under control of said control means, one frictional element comprising a flange having a conical surface and being carried by said armature, the other of said frictional elements comprising a flange having a complementary conical surface, said latter flange being carried by said shaft, and said rollers being retained between said conical surfaces, and a fan disposed on said shaft radially inwardly of said flanges, said flanges being spaced by said rollers to permit cooling air to pass therethrough.

3. The combination of an electric motor housing, and electric motor shaft extending through said housing and a brake comprising a solenoid operated magnet surrounding said shaft, frictional elements surrounding said shaft and control means comprising an armature actuable by said magnet and disposed to effect control of said frictional elements, one of said elements being non-rotative, and the other of said elements being rotative with said shaft, and roller means in angularly spaced array intermediate said elements and in contiguity therewith, said roller means being effective to transmit drag between said elements when said elements are pressed toward each other under control of said control means, said fan being carried on said shaft and a one way clutch intermediate said fan and said shaft whereby said fan may continue to rotate by virtue of its momentum after stoppage of said shaft, said motor housing encompassing said fan, said frictional elements and said rollers, said motor housing having an end closure with an aperture, said motor shaft having a tubular extension with an aperture radially aligned with said frictional elements and said rollers, said motor housing having radial spacing beyond the peripheries of said frictional elements whereby action of said fan effects movement of a cooling fluid through said end casing aperture and through said radial aperture and between said frictional elements and thence radially outward thereof.

4. In a combination as set forth in claim 2, there being recesses in one of said conical surfaces to retain said rollers.

5. In a combination as set forth in claim 4, said rollers being tapered towards their ends.

6. The combination of an electric motor housing and a brake therefor, said electric motor housing having a rotative tubular shaft therein through which air can be drawn from an end thereof and said shaft having a portion provided with at least one radial aperture, a solenoid operated magnet surrounding said shaft, frictional brake disks surrounding said shaft at said apertured portion and means intermediate said disks for effecting radial spacing between all said disks at all times, said means comprising friction-transmitting rollers, an armature intermediate said solenoid and said disks and operable by said solenoid for effecting braking pressure on said disks at one side thereof and an abutment plate carried by said shaft at the other side of said disks and a fan carried on said shaft adjacent said abutment plate and disposed to induce air flow through said shaft and through said aperture and radially between said disks and thence axially into said housing.

References Cited by the Examiner
UNITED STATES PATENTS

| | | | |
|---|---|---|---|
| 1,052,040 | 2/13 | Cook | 192—45 X |
| 1,334,759 | 3/20 | Huebner | 192—40 |
| 2,959,255 | 11/60 | White | 188—264 |
| 3,034,365 | 5/62 | Stieber | 192—30 X |

FOREIGN PATENTS

| | | |
|---|---|---|
| 239,862 | 4/26 | Great Britain. |
| 945,954 | 12/48 | France. |

MILTON O. HIRSHFIELD, *Primary Examiner.*

DAVID X. SLINEY, *Examiner.*